T. W. POMEROY.
Churn and Ice Cream Freezer.
No. 55,960            Patented June 26, 1866.
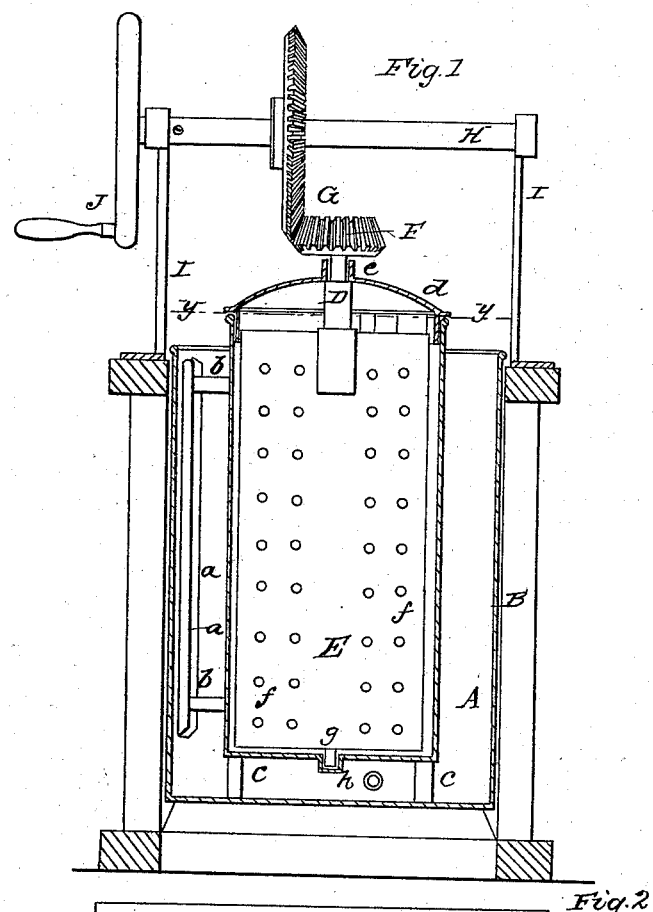
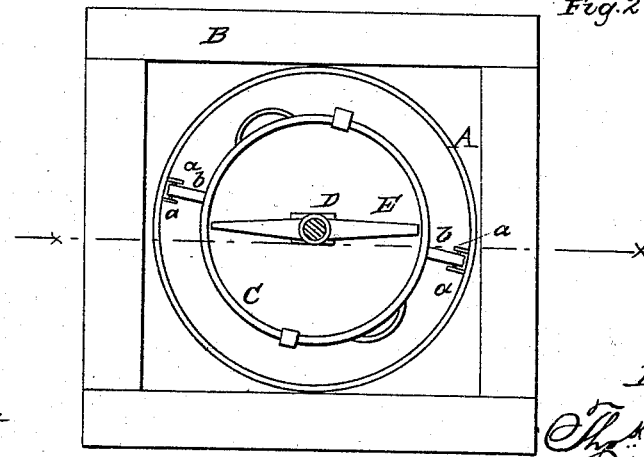
Witnesses            Inventor

UNITED STATES PATENT OFFICE.

THOMAS W. POMEROY, OF EAST HAMPTON, MASSACHUSETTS, ASSIGNOR TO HIMSELF AND WM. J. LAYMAN, OF SAME PLACE.

IMPROVEMENT IN CHURNS AND ICE-CREAM FREEZERS.

Specification forming part of Letters Patent No. 55,960, dated June 26, 1866.

*To all whom it may concern:*

Be it known that I, THOMAS W. POMEROY, of East Hampton, in the county of Hampshire and State of Massachusetts, have invented a new and Improved Churn and Ice-Cream Freezer; and I do hereby declare that the following is a full, clear, and exact description thereof, which will enable those skilled in the art to make and use the same, reference being had to the accompanying drawings, forming part of this specification, in which—

Figure 1 is a vertical central section of my invention, taken in the line $x\ x$, Fig. 2; Fig. 2, a horizontal section of the same, taken in the line $y\ y$, Fig. 1.

Similar letters of reference indicate corresponding parts.

This invention relates to an improved churn and ice-cream freezer; and it consists in a novel arrangement of the cream-receptacle and an external case, as hereinafter fully shown and described, whereby cream may be churned and butter produced in the most expeditious manner possible, and superior butter obtained, owing to the cream being brought to a proper degree of temperature during the operation of churning. The same device also serves as a superior ice-cream freezer.

The invention is designed as an improvement upon the double-walled or thermometer churns, which are comparatively expensive to manufacture and do not admit of having the chamber formed by the double walls cleaned with facility, nor admit of said chamber being filled with ice to serve as an ice-cream freezer.

A represents a cylindrical case, which is permanently secured within a proper framing, B. This case may be constructed of sheet metal or other suitable material, and to its inner surface, at opposite sides of its center, there are attached vertical lips $a\ a$, extending nearly the whole height of the case, and serving as guides to receive horizontal arms $b$, which project from an inner cylinder, C. This inner cylinder, C, is considerably less in diameter than the case A, and it is provided with feet $c$, which admit of a space between its bottom and the bottom of A, said space being about equal in height to the width of the space between A and C. (See Fig. 1.)

By this arrangement it will be seen that the cylinder C may be readily drawn out from A and adjusted within it, and still C not allowed to rotate within A.

The top of the cylinder C is provided with a cover, $d$, having a circular opening at its center, encompassed by a short vertical tube, $e$, through which a shaft, D, passes, said shaft being secured to the center of the upper end of a dasher, E, which may be described as being formed of a flat board slightly beveled or tapered from its center outward toward both edges (see Fig. 2) and perforated with holes $f$, as shown in Fig. 1.

The lower end of the dasher E is provided with a journal, $g$, which is fitted in a step, $h$, at the center of the bottom of C, (see Fig. 1,) and the dasher E extends nearly to the inner surface of C.

On the upper end of the shaft D there is secured a bevel-pinion, F, with which a bevel-wheel, G, gears, said wheel being upon a horizontal shaft, H, the bearings of which are in standards I, attached to the upper end of the framing B. It is designed, in practice, to have these bearings constructed in such a manner as to admit of the shaft H being readily detached or removed to facilitate the withdrawal of the cylinder C from the case A when required.

When the device is used as a churn the space between the case A and cylinder C is supplied with hot or cold water, as may be required, in order to bring the cream, which is placed in C, to a proper degree of temperature, warm water being used if the cream is at too low a temperature, and cold water used if the cream is at too high a temperature. The dasher E is rotated by turning the shaft H through the medium of a crank or crank-wheel, J.

When the device is used as an ice-cream freezer, ice and salt are placed in the space between the case A and the cylinder C, and the dasher E should be sufficiently wide to work in contact with the inner surface of C.

It will be seen from the above description that the device may be constructed at a very moderate cost and all the parts are rendered very accessible, the cylinder C being readily withdrawn from the case A whenever required.

I do not claim, broadly, a double-walled churn, for they have been previously used, nor do I claim a rotary dasher operated by bevel-gears; but I do claim as new and desire to secure by Letters Patent.—

The combination of the cylinder C with the case A and rotary dasher E, when the cylinder C is secured within the case A by means of horizontal arms *b*, projecting from C and fitted between guides or lips *a*, attached to the inner surface of A, and either with or without the feet *c*, to rest on the bottom of A, substantially as and for the purpose specified.

THOMAS W. POMEROY.

Witnesses:
 GEO. S. CLARK,
 L. D. BROWN.